(12) United States Patent
Overbay et al.

(10) Patent No.: US 11,199,499 B2
(45) Date of Patent: Dec. 14, 2021

(54) SURFACE ENHANCED LUMINESCENCE ANALYTE INTERROGATION STAGE WITH SACRIFICIAL COATING

(71) Applicant: HEWLETT-PACKARD DEVELOPMENT COMPANY, L.P., Houston, TX (US)

(72) Inventors: Milo Overbay, Corvallis, OR (US); Anita Rogacs, Palo Alto, CA (US); Devin A. Mourey, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 683 days.

(21) Appl. No.: 16/076,345

(22) PCT Filed: Jul. 20, 2017

(86) PCT No.: PCT/US2017/042948
§ 371 (c)(1),
(2) Date: Aug. 8, 2018

(87) PCT Pub. No.: WO2019/017943
PCT Pub. Date: Jan. 24, 2019

(65) Prior Publication Data
US 2021/0172874 A1 Jun. 10, 2021

(51) Int. Cl.
*G01N 21/64* (2006.01)
*G01J 3/44* (2006.01)
*G01N 21/65* (2006.01)

(52) U.S. Cl.
CPC ............. *G01N 21/648* (2013.01); *G01J 3/44* (2013.01); *G01N 21/658* (2013.01)

(58) Field of Classification Search
CPC .. G01N 21/553; G01N 21/554; G01N 21/648; G01N 21/658; G02B 6/1226; G02B 5/008; G01J 3/44
See application file for complete search history.

(56) References Cited

U.S. PATENT DOCUMENTS

| | | | |
|---|---|---|---|
| 7,898,658 B2 | 3/2011 | Moskovits et al. | |
| 8,330,951 B2 | 12/2012 | Li et al. | |
| 8,848,183 B2 | 9/2014 | Yi et al. | |
| 9,212,997 B2 | 12/2015 | Gibson et al. | |
| 2003/0059820 A1 | 3/2003 | Vo-Dinh | |
| 2010/0284001 A1* | 11/2010 | Moskovits | G01N 21/658 356/301 |
| 2011/0166045 A1 | 7/2011 | Dhawan et al. | |

(Continued)

OTHER PUBLICATIONS

Liao et al., "An Effective Oxide Shell-Protected Surface-Enhanced Raman Scattering (SERS) Substrate: The Easy Route To Ag@AgxO-Silicon Nanowire Films Via Surface Doping", Journal of Materials Chemistry C, vol. 1, 2013, pp. 1628-1632.

*Primary Examiner* — Dominic J Bologna
(74) *Attorney, Agent, or Firm* — Tong Rea Bentley & Kim LLC

(57) ABSTRACT

A surface enhanced luminescence analyte interrogation stage may include a substrate and an array of pillars projecting from the substrate. Each of the pillars may include a polymeric post formed from a first material and a cap on the polymeric post. The cap has a plasmonic surface and is formed from a second material different than the first. A sacrificial coating covers the cap of each of the pillars.

13 Claims, 8 Drawing Sheets

(56) References Cited

U.S. PATENT DOCUMENTS

| | | | |
|---|---|---|---|
| 2012/0081703 A1* | 4/2012 | Moskovits | G01N 21/658 |
| | | | 356/301 |
| 2014/0209837 A1* | 7/2014 | Barcelo | G01N 21/658 |
| | | | 252/408.1 |
| 2014/0218727 A1 | 8/2014 | Li et al. | |
| 2015/0116706 A1 | 4/2015 | Barcelo et al. | |
| 2015/0374268 A1* | 12/2015 | Yamakawa | G01N 21/658 |
| | | | 435/29 |
| 2018/0372543 A1* | 12/2018 | Chen | G01J 3/44 |

\* cited by examiner

SURFACE ENHANCED LUMINESCENCE ANALYTE INTERROGATION STAGE WITH SACRIFICIAL COATING

BACKGROUND

Surface enhanced luminescence (SEL) is sometimes used for analyzing the structure of inorganic materials and complex organic molecules. SELS focuses electromagnetic radiation or light onto an analyte or solution containing an analyte, wherein the interaction between the light and the analyte is detected for analysis.

Figure 1:
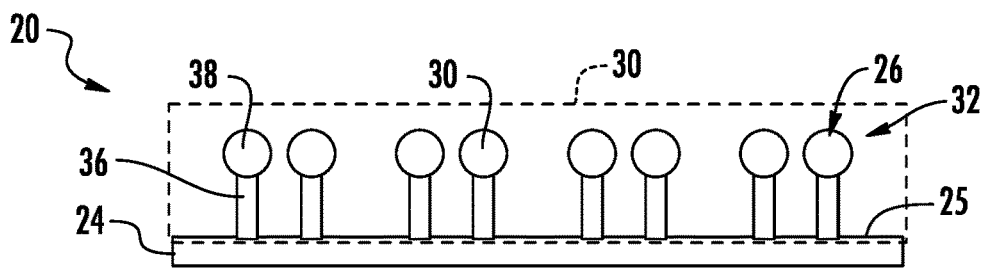
FIG. 1 is a side view schematically illustrating an example protected analyte interrogation stage.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Surface enhanced luminescence (SEL) may utilize a plasmonic surface that may enhance a response of a supported analyte during interrogation of the analyte. Such a plasmonic surface may be a roughened surface or in otherwise uneven surface formed from a plasmonic material such as a metal. Examples of such plasmonic metals include, but are not limited to, gold, silver and the like. During shipping or storage, the plasmonic surface may be susceptible to airborne contaminants. Contamination of the plasmonic surface may reduce adsorption of an analyte on the plasmonic surface and may further reduce the presence of conductive electrons which form plasmon resonance during interrogation of the analyte.

In some implementations, the uneven plasmonic surface may be provided by an array of pillars, each pillar being formed from a polymer post that supports a metallic cap. The polymer posts are bendable, facilitating closing of the metallic caps to form "hotspots" that enhance plasmon resonance and facilitate enhanced interrogation of an analyte. The polymer posts may be subject to outgassing during shipping and storage. The outgassing of the polymer materials of the posts may contaminate the metallic caps. Airborne contaminants may additionally contaminate the metallic caps. Contamination of the metallic caps and their degradation reduces adsorption of an analyte on the plasmonic active surfaces provided by the metallic caps. Contamination of the metallic caps may further reduce the presence of conductive electrons which form plasmon resonance.

Disclosed herein is a surface enhanced luminescence analyte interrogation stage that may include a substrate and an array of pillars projecting from the substrate. Each of the pillars may include a polymeric post formed from a first material and a cap on the polymeric post. The cap has a plasmonic surface and is formed from a second material different than the first. A sacrificial coating covers the cap of each of the pillars.

Disclosed herein is an example method for forming a surface enhanced luminescence analyte interrogation stage. The method may include providing an enhanced luminescence plasmonic analyte interrogation stage having a finished uneven surface with at least one plasmonic surface and forming a sacrificial coating of a sacrificial material on the at least one plasmonic surface.

Disclosed herein is a surface enhanced luminescence analyte interrogation stage that may include an uneven plasmonic surface having a profile and a sacrificial coating formed by a film of sacrificial material having a profile corresponding to a profile of the uneven plasmonic surface.

Disclosed herein are example SEL analyte interrogation stages polymer posts and metallic caps, wherein contamination of the metallic caps is reduced or prevented through the use of a sacrificial coating covering the metallic caps. The sacrificial coating may be removed just before use, exposing the underlying material of the metallic caps. As a result, the metallic caps are cleaner at the time of use. The cleaner metallic caps improve plasmon resonance of the conductive electrons and enhance analyte adsorption.

Disclosed herein is an example surface enhanced luminescence interrogation stage that may include a substrate and an array of pillars projecting from the substrate. Each of the pillars may include a polymeric post and a metallic cap on the polymeric post. A sacrificial coating covers the metallic cap of each of the pillars.

Disclosed herein is an example method for forming an analyte interrogation stage. The method may comprise exposing metallic caps on polymeric posts of a surface enhanced luminescence interrogation stage to a sacrificial material and depositing the sacrificial material on the metallic caps to form a sacrificial coating of the sacrificial material on the metallic caps. Disclosed herein is an example method for using such an analyte interrogation stage. The method may comprise removing the sacrificial coating on the metallic caps, binding an analyte to the metallic caps and closing the metallic caps for interrogation.

Disclosed herein is an example surface enhanced luminescence system. The system may comprise a sensing chamber comprising an array of pillars, each of the pillars comprising a metallic tip coated with a sacrificial coating. The system may further comprise a waste passage connected or connectable to the sensing chamber, a sacrificial coating solvent supply passage connected or connectable to the sensing chamber, a rinse solution supply passage connected or connectable to the sensing chamber and an analyte solution supply passage connected or connectable to the sensing chamber.

FIG. 1 is a diagram illustrating a side of an example protected SEL analyte interrogation stage 20 for supporting an analyte as the analyte is being interrogated using one or more surface enhanced luminescence testing techniques. Examples of SEL testing techniques include, but are not limited to, surface enhanced Raman spectroscopy, surface enhanced hyper Raman scattering, surface enhanced fluorescence, surface plasmon resonance spectroscopy and localized surface plasmon resonance spectroscopy. The protected analyte interrogation stage 20 utilizes a sacrificial coating that protects underlying plasmonic surfaces and facilitates the subsequent removal of any contaminants prior to use of the stage 20.

The protected analyte interrogation stage 20 comprises substrate 24, pillars 26 and sacrificial coating 30. Substrate 24 comprises a base or foundation for supporting pillars 26. In one implementation, substrate 24 comprises a layer of silicon, quartz, glass or polymeric films such as polyethylene terephthalate (PET). In some implementations, substrate 24 may additionally comprise an interlayer of a dielectric material between the silicon substrate and pillars 26. Such an interlayer dielectric may be formed from a material such as $SiO_2$ TEOS, a passivation layer of SiC, silicon nitride etc. In other implementations, other interlayer dielectric materials may be utilized. In still other implementations, substrate 24 may be formed from other materials such as quartz, ceramics, polymers and other materials.

Pillars 26, sometimes referred to as nano fingers, comprise columnar structures projecting from substrate 24. Pillars 26 form an array 32 across the surface of substrate 24. Each of pillars 26 comprises a post 36 and a cap 38 on and supported by the post 36. Each post 36 is formed from a first material while each respective 38 is formed from a second material different than the first material, wherein the second material of each cap forms a portion of the total uneven plasmonic surface of stage 20.

In one implementation, such posts 36 have an aspect ratio of at least 10:1 (a height of at least 10 times the thickness or diameter). In one implementation, such posts have a thickness or diameter between 50 nm and 100 nm, while, at the same time, having a height of at least 500 nm and, in one implementation, at least 700 nm. In some implementations, the posts 36 are movable and are self-actuating, wherein such columnar structures bend or flex towards one another in response to micro-capillary forces so as to self-organize, wherein such bending facilitates close spacing between the structures for greater scattered radiation intensity.

In one implementation, each of the posts 36 is formed from a polymer material. The polymer material from which posts 36 are formed facilitates the use of molding, imprinting or other fabrication techniques to form posts 36. The polymer material further facilitates bending and flexing of posts 36 and subsequent closing during use of stage 20. Examples of polymer materials from which each post 828 may be formed include, but are not limited to, photo resists, hard mold resins such as PMMA, soft mold polymers such as PDMS, ETFE or PTFE, Hybrid-mold cross-linked uv-curable or thermal-curable polymers based on acrylate, methacrylate, vinyl, epoxy, silane, peroxide, urethane or isocyanate. The polymer materials may be modified to improve imprint and mechanical properties with copolymers, additives, fillers, modifiers, photoinitiators and the like.

In one implementation, caps 38 are formed from a metal, material creating the plasmonic surface. Each metallic cap 38 comprises a conductive material that enhances the intensity of nearfield electromagnetic radiation through plasmon resonance when exposed to an external light source. Greater enhancement can be achieved by collapsing the pillars 26 so the distance between caps becomes very small creating hot spots 360. This enhanced radiation interacts with the analyte on or adjacent to the metallic caps 38 and emits an enhanced analyte signal. In one implementation, each metallic cap 38 comprises silver, gold, copper, platinum, aluminum, or combinations of these metals in the form of alloys or multilayer systems. In another implementation, each metallic cap 38 may comprise other conductive materials that provide such intensity enhancement.

Sacrificial coating 30 comprises at least one layer of material that covers the metallic caps 38 of pillars 26. Sacrificial coating 30 protects the underlying metallic caps 38 from contamination. Sacrificial coating 30 is sufficiently impermeable to substantially reduce or inhibit the passage of contaminants there through to the underlying metallic caps 38.

Sacrificial coating 30 further comprises a material having a composition that is separable from the metallic caps 30 while maintaining an integrity of each of the pillars 26 and substrate 24. In one implementation, sacrificial coating 30 comprises a material that is separable from the underlying metallic caps 38 upon the application of heat to the material. In one implementation, sacrificial coating is formed from a material that attains a liquid state upon being heated so as to flow off of and away from the underlying metallic caps 38 to expose the metallic caps for subsequent analyte binding. In one implementation, sacrificial coating 30 may comprise a wax-based coating removable with an aliphatic solvent or alcohol. Examples of such materials for sacrificial coating 30 include, but are not limited to, emulsifying, microcrystalline white or yellow waxes or custom blended sealing waxes.

In another implementation, sacrificial coating 30 comprises a material that is separable from the metallic caps upon application of a solvent to the materials. Sacrificial coating 30 comprises a material that dissolves in response to exposure to the solvent. In one implementation, sacrificial coating may be immersed in such a solvent, wherein the solvent with the dissolved sacrificial coating 30 may be subsequently withdrawn or washed away to expose the metallic caps for subsequent analyte binding. Examples of materials for such a sacrificial coating include inorganic coatings such as inorganic oxides that are dissolvable in a solvent comprising a weak acid or base mixture. Examples of inorganic oxides that may be utilized include, but are not limited to, zinc oxide, aluminum oxide, hafnium oxide, copper oxide, nickel oxide, tin oxide, tantalum oxide and titanium oxide. Examples of other materials for sacrificial coating that are selectively dissolvable in a solvent include, but are not limited to, carbides, nitrides, sulfides, and metals.

In another implementation, sacrificial coating 30 comprises a material that is separable from the underlying metallic caps 38 upon exposure to a selected wavelength of light. Applying a selected wavelength of light to the material of sacrificial coating 30 may result in the material of sacrificial coating 30 degrading to a point that sacrificial coating 30 may be washed away from the underlying metallic caps 38 or may be dissolved in a solvent which is then removed to expose the underlying metallic caps 38 for analyte binding. For example, in one implementation, sacrificial coating may comprise a positive photoresist based on Diazonaphthoquinone and phenolic resin DNQ/Novolac, wherein the material sacrificial coating 30 degrades in response to application of light having wavelength of between 300 nm and 450 nm.

Sacrificial coating 30 completely covers each of metallic caps 38. In one implementation, sacrificial coating 30 completely covers each of metallic caps 38 and also completely covers the side surfaces of each of posts 36. In one implementation, sacrificial coating 30 may additionally extend along the floor 25 of substrate 24 between consecutive pillars 26. In other implementations, sacrificial coating 30 may partially cover metallic caps 38 and/or pillars 36.

In one implementation, sacrificial coating 30 comprises a film coating, having a thickness such that coating 30 has a profile or shape that corresponds to the profile of the underlying metallic cap 38. In one implementation, sacrificial coating 30 comprises a film coating that has a profile or shape corresponding to the shape of the entire underlying pillar 26. Such a coating may sufficiently protect metallic caps 38 from contamination while being more easily separated from the underlying metallic caps 38 in a shorter period of time or with less aggressive sacrificial coating separation treatment parameters. In one such implementation, sacrificial coating 30 may have a thickness of 5 nm to 10 nm. For example, in one implementation, sacrificial coating 30 may comprise an inorganic oxide, such as aluminum oxide, zinc oxide, tantalum oxide or titanium oxide, having a thickness of 5 nm to 10 nm.

As shown by broken lines, in other implementations, sacrificial coating 30 may completely encase or encapsulate each individual finger 26 or the array 32 of nano fingers 26. As such, coating 30 completely fills in the spaces between and continuously extends between pillars 26, continuously extending between the sides of posts 36 and continuously extending between the sides of metallic caps 38 in directions parallel to substrate 24. In such an implementation, coating 30 comprise a single continuous layer having a height above floor 25 of substrate 24 that is greater than the height of pillars 26. The complete encapsulation of pillars 26 may protect pillars 26 from damage prior to use and may inhibit aggregation of caps 38 of pillars 26 during shipping and storage, in addition to inhibiting contamination of metallic caps 38.

Figure 2:
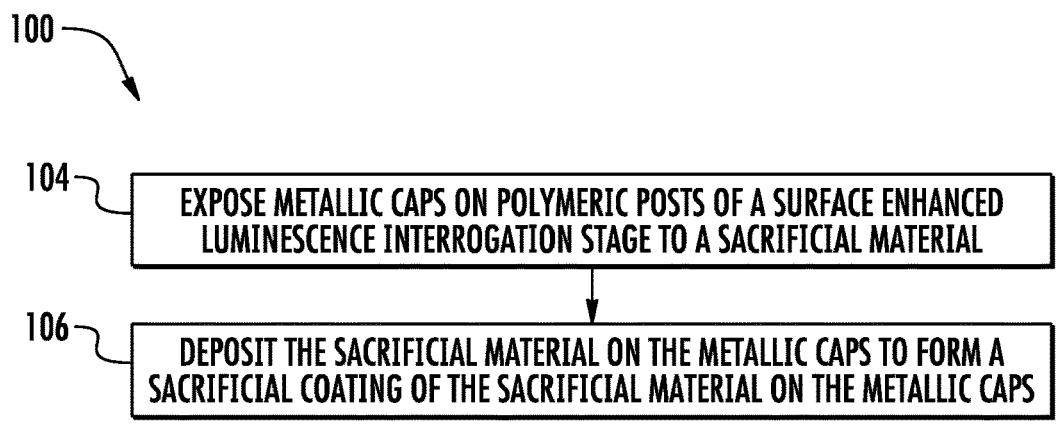
FIG. 2 is a flow diagram of an example method for forming a protected analyte interrogation stage.

FIG. 2 is a flow diagram of an example method 100 for forming an example protected analyte interrogation stage, such as stage 20. Method 100 may be utilized to form any of the SEL analyte interrogation stages described in the disclosure or similar SEL analyte interrogation stages. As indicated by block 104, metallic caps 38 on polymeric posts 36 of a surface enhanced luminescence interrogation stage are exposed to a sacrificial material, such as the sacrificial material of coating 30 described above. In one implementation, metallic caps 38 are exposed to a solution containing the material of sacrificial coating 30. In another implementation, metallic caps 38 are exposed to a gas carrying the elements of sacrificial coating 30 or airborne elements of sacrificial coating 30. In one implementation, metallic caps 30 are immersed in a solution or gas containing the sacrificial materials of coating 30. In another implementation, metallic caps 38 are exposed to the sacrificial material upon the direct application of the sacrificial material on the outer surface of metallic caps 38.

As indicated by block 106, the sacrificial material is deposited onto metallic caps 38 to form the sacrificial coating 30. In one implementation, the sacrificial material is directly adhered to the outer surface of metallic caps 38. In some implementations, sacrificial material is additionally directly adhered to the outer surface of pillars 36. In other implementations, a layer of an adhesive material or an intermediate liquid coating may first be applied to the outer surface of at least metallic caps 38 prior to the deposition and adherence of the sacrificial material to the adhesive material or intermediate liquid coating, which upon solidifying, joins the sacrificial material to the surface of metallic caps 38.

In one implementation, the exposure of the metallic caps 38 to the sacrificial material and the deposition of the sacrificial material on the metallic caps is carried out using atomic layer deposition. Such atomic layer deposition facilitates the forming of sacrificial coating 30 as a film coating. In other implementations, the exposure of the metallic caps 38 to the sacrificial material and the deposition of the sacrificial material on the metallic caps may be carried out using other techniques such as chemical vapor deposition, e-beam evaporation or thermal evaporation.

Figure 3:
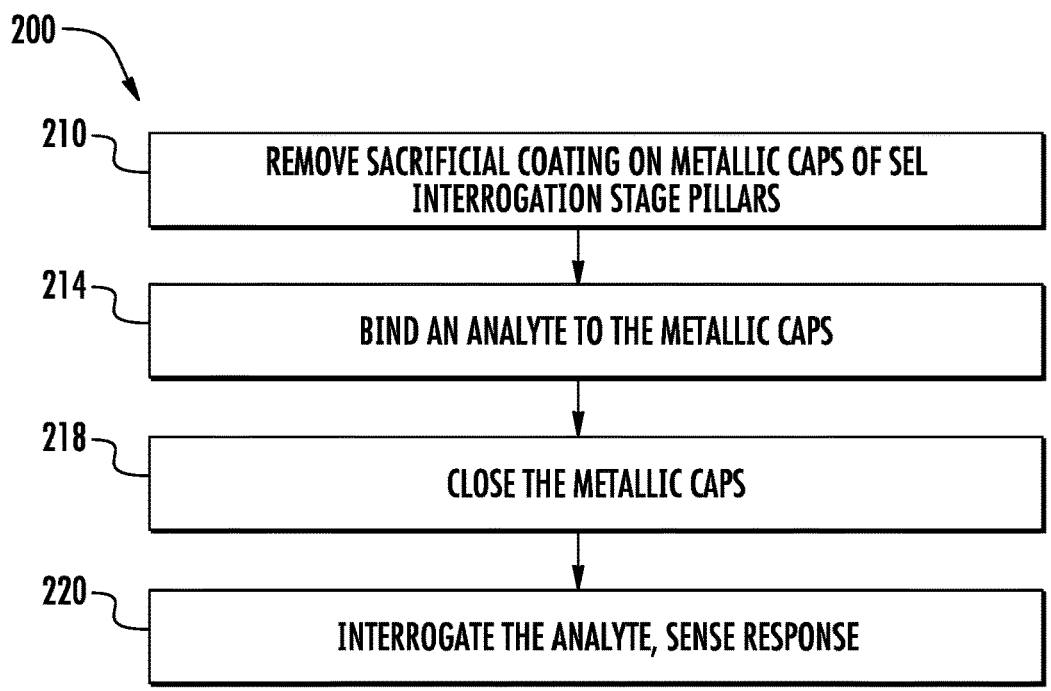
FIG. 3 is a flow diagram of an example method for preparing and using an example analyte interrogation stage.

FIG. 3 is a flow diagram of an example method 200 for utilizing a protected SEL analyte interrogation stage 20 or a similar analyte interrogation stage. As indicated by block 210, when stage 20 is to be used, sacrificial coating 30 is removed. Sacrificial coating 30 is removed without altering a structural integrity of the underlying metallic caps 38 or the structural integrity of each of pillars 26.

As discussed above, parameters for the removal of sacrificial coating 30 depend upon the sacrificial material of coating 30, the available time for such removal, the durability and composition of metallic caps 38 and/or posts 36 and the thickness of coating 30. Sacrificial coating 30 may be removed through the application of heat, through dissolution in a solvent, through the exposure of the coating 30 two a gas and/or through the application of selected wavelength of light. In some implementations, combination of such treatments may be carried out to remove sacrificial coating 30. In some implementations, complete removal may further involve washing pillars 26 with a solution. In one example implementation, where sacrificial coating 30 comprises a wax-based coating, coating 30 may be removed with an aliphatic solvent or alcohol. In another implementation, sacrificial coating 30 comprises an inorganic coating based on a metal, metal oxide, metal carbide, metal nitride or metal sulfide. Examples of metals include but are not limited to zinc, titanium, tin, copper, niobium, nickel and hafnium metal oxide. Representative examples include aluminum oxide, zinc oxide, tantalum oxide or titanium oxide. Suitable metal carbide examples include titanium carbide, tantalum carbide and tungsten carbide. Metal nitrides include those based on zirconium, tantalum, tungsten, vanadium and niobium. Metal sulfide examples include molybdynum, nickel, zinc and copper-iron. Sacrificial coating 30 may be removed using an acid, other suitable etchant, base or ionizing gas. Weak acids include but are not limited to, hydrochloric acid, glacial acetic acid, nitric acid, formic acid, phosphoric acid, sulfuric acid, hydrofluoric acid and oxalic acid. Other suitable etchants include, but are not limited to, peroxides and metal cyanates. Suitable bases are alkali solutions based on sodium hydroxide, potassium hydroxide, chromates, sulfates, perchlorates and the like. Any of the above compounds may be combined in various dilutions and combinations in the art of metal etching such as the formulations provided in the CRC Handbook of Metal Etchants. Another category of suitable etchants for removing sacrificial coatings that are based on metals, metal oxides, metal carbides, metal nitrides and metal sulfates include ionizing gases such as oxygen, argon, xenon fluoride, carbon tetrafluoride, neon and the like; which also detailed in the CRC Handbook of Metal Etchants.

As indicated by block 214, the analyte, a composition being analyzed or tested, is bound to the metallic caps 38. In one implementation, the analyte is carried in a liquid or solution, wherein pillars 26 are immersed within the solution containing the analyte. In another implementation, the analyte is carried in a gas or is airborne, wherein the gas or air carrying the analyte is directed across pillars 26. The pillars 26 are immersed in the analyte containing liquid or the analyte containing gas for a sufficient incubation to allow the analyte molecules or particles to adhere to metallic caps 38.

As indicated by block 218, the metallic caps 38 are closed, wherein the metallic caps 38 are drawn or moved into closer proximity to one another. Metallic caps 38 are closer drawn to one another so as to be sufficiently close so as to form "hotspots" between the sides or edges of metallic caps 38 of consecutive pillars 26. In one implementation, metallic caps 38 are drawn to within 2 nm of one another.

In one implementation, the metallic caps 38 are drawn together or are "closed" from the creation of capillary forces resulting from the withdrawal of an analyte containing solution used to expose metallic caps 38 to the analyte in block 214. Evaporation of the solution creates such capillary forces. In one implementation, such evaporation may be facilitated through the supplemental addition of heat. In yet other implementations, the metallic caps 38 of consecutive pillars 26 may be drawn together or closed using other forces and other mechanisms.

Figure 4:
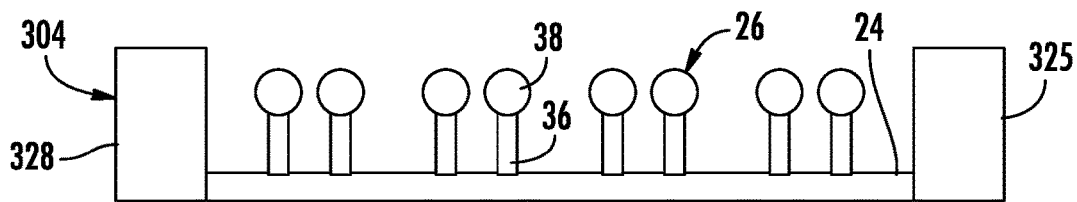
FIGS. 4-6 are side views schematically illustrating an example implementation of the method of FIG. 2.
Figure 5:
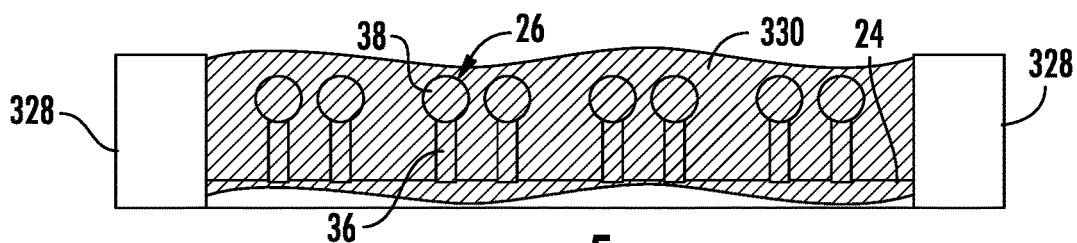
Figure 6:
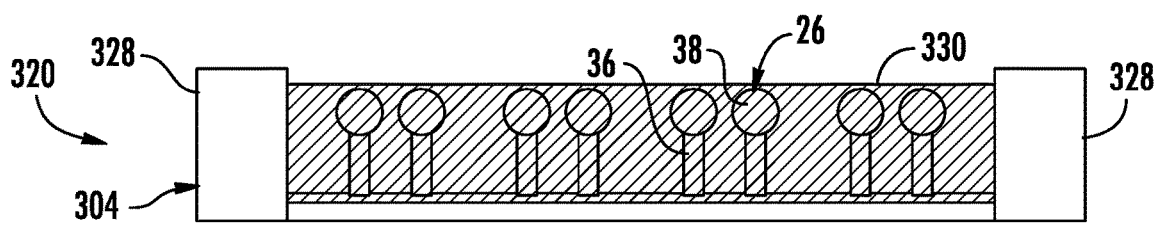

FIGS. 4-6 are side views illustrating the protecting of an example SEL analyte interrogation stage 320 (shown completed in FIG. 6) formed with method 100 described above. FIG. 4 illustrates an uncoated or unprotected SEL analyte interrogation stage 300 comprising a fluidic container 304, substrate 24 and pillars 26. Container 304 forms a volume to contain and receive a fluid/liquid. In the example illustrated, packaging 304 has a floor formed by substrate 24 and sidewalls 328. Sidewalls rise from substrate 24. In one implementation, sidewalls 328 and substrate 24 form a fluid channel through which fluid may flow in which may be temporarily stopped to contain a fluid. In other implementations, sidewalls and roof 328 and substrate 24 form a basin to contain a fluid. Substrate 24 and pillars 26 are described above.

FIG. 5 illustrates one example of method 100, wherein metallic caps 38 pillars 26 are exposed to a sacrificial material and wherein the sacrificial material becomes deposited on the metallic caps 38 to form a sacrificial coating 330 on metallic caps 38. Sacrificial coating 330 is similar to sacrificial coating 30 described above. In the example illustrated, sacrificial coating 330 encapsulates or encases pillars 26. In the example illustrated, sacrificial coating 330 comprises a single continuous layer extending between sidewalls 328 and having a thickness greater than a height of metallic caps 38.

As shown by FIG. 6, sacrificial coating 330 is dried or cured to attain a solid state or semi-solid-state. The solid or semi-solid state of coating 330 further stabilizes pillars 26 prior to use during shipping and storage and inhibits premature aggregation of metallic caps 38 prior to use.

FIGS. 7-11 are side views illustrating one example of method 200 for using a protected SEL analyte interrogation stage 320. FIGS. 7-11 illustrate method 200 and carried out using analyte interrogation stage 320, wherein sacrificial coating 330 specifically comprises a sacrificial material that is dissolvable in a liquid or solvent. For example, in one implementation, analyte interrogation stage 320 may comprise a sacrificial coating 330 formed from an inorganic oxide which is dissolvable with a weak acid.

Figure 7:
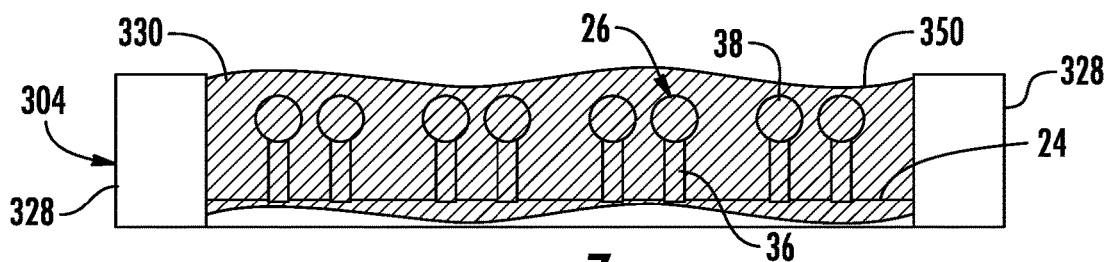
FIGS. 7-11 are side views schematically illustrating an example implementation of the method of FIG. 3.
Figure 8:
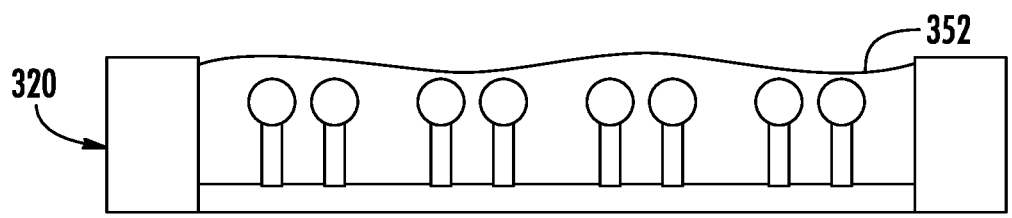

FIGS. 7 and 8 illustrate one example of block 210 of method 200. FIG. 7 illustrates one example of removing sacrificial coating 330. FIG. 7 illustrates the application of a solvent or other liquid upon coating 330, wherein the composition of coating 330 and the composition of the liquid or solvent 350 are such that coating 330 dissolves in solvent 350. FIG. 8 illustrates stage 320 after sacrificial coating 330, dissolved within solvent 350, has been removed and further illustrates the application of a rinsing solution 352 to enhance the removal of solvent 350 in the dissolved sacrificial material of coating 330. Following such washing, analyte interrogation stage 320 is ready for use, providing an array of pillars 26 having contaminant free or cleaner metallic caps 38 ready for the adherence or binding of an analyte.

Figure 9:
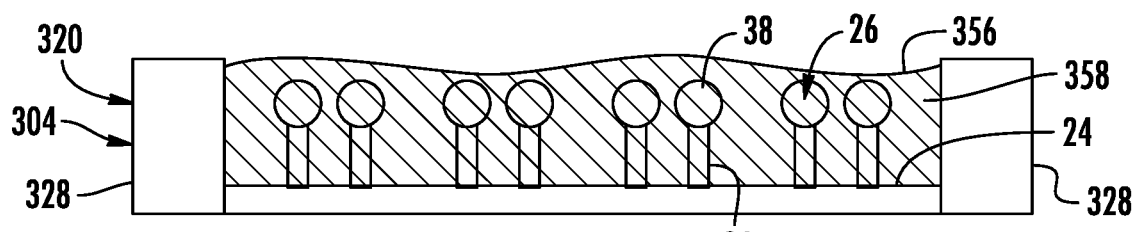
Figure 10:
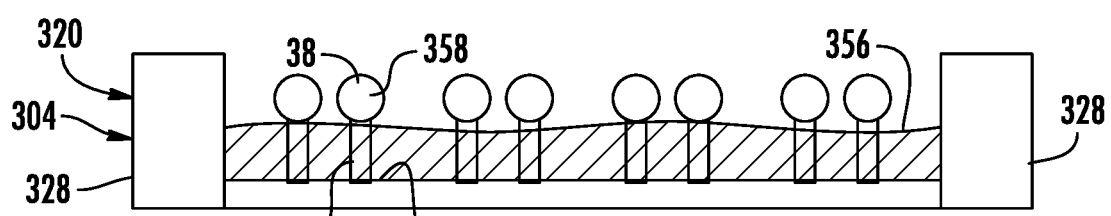
Figure 11:
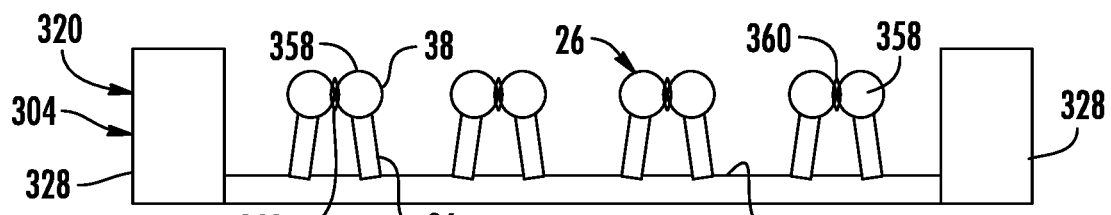

FIGS. 9-11 illustrate one example of blocks 214 and 218 of method 200. FIGS. 9 and 10 illustrate the binding of an analyte onto the metallic caps 38. FIG. 9 illustrates the immersion of pillars 26 and metallic caps 38 and analyte solution 356. Solution 356 contains analyte 358 which binds to or becomes deposited upon metallic caps 38. FIG. 10 illustrates the removal of analyte solution 356 followed by the rinsing of pillars 26 after analyte adsorption. FIG. 11 illustrates the closing of metallic caps 38. In particular, FIG. 11 illustrates the drying of pillars 26, such as through evaporation, such that capillary action closes pillars 26, creating hotspots 360 between consecutive closed pillars 26.

Following the closure of metallic caps 38 and the creation of hotspots 360, the analyte 358 on metallic caps 38 may be interrogated using surface enhanced luminescence procedures, such as surface enhanced Raman spectroscopy or fluorescence. As indicated above, sacrificial coating 330 provides a cleaner surface for metallic caps 38, providing better analyte adsorption and enhanced plasmon resonance.

Figure 12:
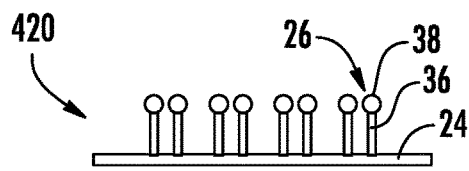
FIGS. 12 and 13 are side view schematically illustrating an example implementation of the method of FIG. 2.
Figure 13:
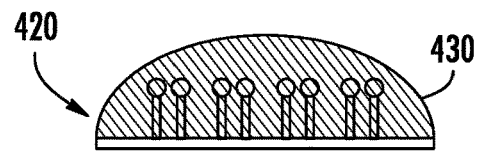

FIGS. 12-13 are side views illustrating the forming of a protected or coated SEL analyte interrogation stage 420 (shown completed in FIG. 13). As shown by FIGS. 12 and 13, blocks 104 and 106 of method 100 are carried out without pillars 26 being contained within a fluidic channel or package. As shown by FIG. 13, metallic caps 38 and pillars 26 are encapsulated by a mass of sacrificial material to form a sacrificial coating 430 on metallic caps 38. Sacrificial coating 330 is similar to sacrificial coating 30 described above. In the example illustrated, sacrificial coating 430 encapsulates or encases pillars 26. As shown by FIG. 6, sacrificial coating 430 is dried or cured to attain a solid state or semi-solid-state. The solid or semi-solid state of coating 330 further stabilizes pillars 26 prior to use during shipping and storage and inhibits premature aggregation of metallic caps 38 prior to use.

FIGS. 14-18 are side views illustrating one example of method 200 for using a protected SEL analyte interrogation stage 420. FIGS. 14-18 illustrate method 200 being carried out using analyte interrogation stage 420, wherein sacrificial coating 430 specifically comprises a sacrificial material that is dissolvable in a liquid or solvent. For example, in one implementation, analyte interrogation stage 420 may comprise a sacrificial coating 430 formed from an inorganic oxide which is dissolvable with a weak acid.

Figure 14:
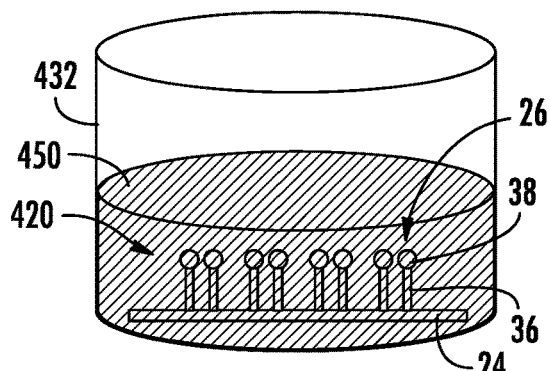
FIGS. 14-18 are side view schematically illustrating an example implementation of the method of FIG. 3.
Figure 15:
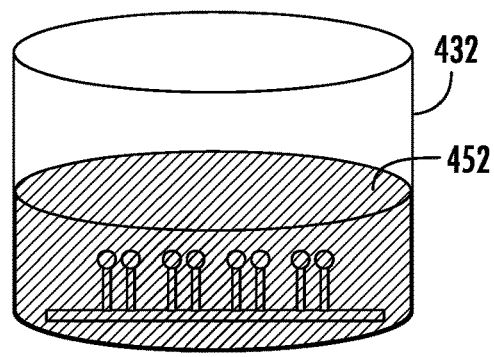

FIGS. 14-15 illustrate one example of block 210 of method 200. FIG. 14 illustrates one example of removing sacrificial coating 430. FIG. 14 illustrates the positioning of the protected analyte interrogation stage 420 of FIG. 13 in a container 432 which contains or is subsequently filled with a solvent or other liquid 450 about coating 430, wherein the composition of coating 430 and the composition of the liquid or solvent 450 are such that coating 430 dissolves in solvent 450. FIG. 15 illustrates stage 420 after sacrificial coating 430, dissolved within solvent 450, has been removed and further illustrates the application of a rinsing solution 452 to enhance the removal of solvent 450 and the dissolved sacrificial material of coating 430. Following such washing/rinsing, analyte interrogation stage 420 is ready for use, providing an array of pillars 26 having contaminant free or cleaner metallic caps 38 ready for the adherence or binding of an analyte.

Figure 16:
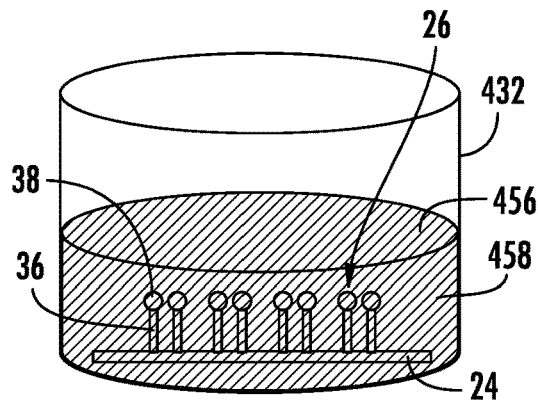
Figure 17:
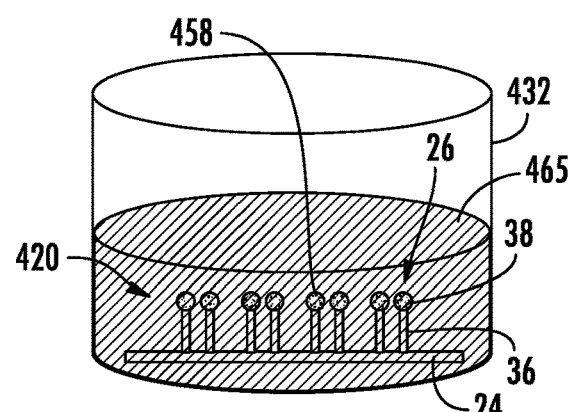
Figure 18:
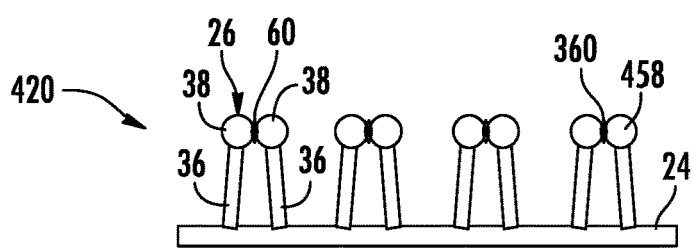

FIGS. 16-18 illustrate one example of blocks 214 and 218 of method 200. FIGS. 16 and 17 illustrate the binding of an analyte onto the metallic caps 38. FIG. 16 illustrates the immersion of pillars 26 and metallic caps 38 and analyte solution 456. Solution 456 contains analyte 458 which binds to or becomes deposited upon metallic caps 38. FIG. 17 illustrates the removal of analyte solution 456 followed by the rinsing of pillars 26 after analyte adsorption. FIG. 18 illustrates the closing of metallic caps 38. In particular, FIG. 18 illustrates the drying of pillars 26, such as through evaporation, such that capillary action closes pillars 26, creating hotspots 360 between consecutive closed pillars 26.

Following the closure of metallic caps 38 and the creation of hotspots 360, the analyte 458 on metallic caps 38 may be interrogated using surface enhanced luminescence procedures, such as surface enhanced Raman spectroscopy or fluorescence. As indicated above, sacrificial coating 430 provides a cleaner surface for metallic caps 38, providing better analyte adsorption and enhanced plasmon resonance.

Figure 19:
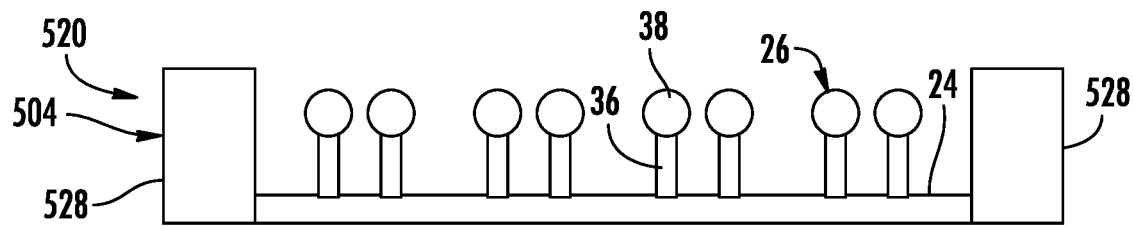
FIGS. 19-21 are side view schematically illustrating an example implementation of the method of FIG. 2.
Figure 20:
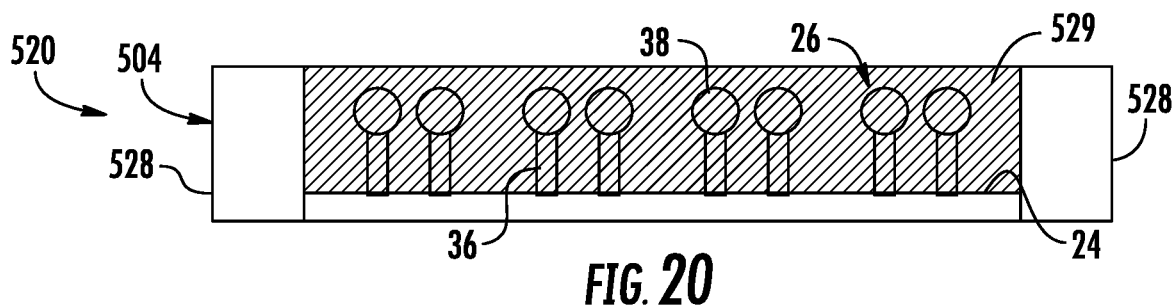

FIGS. 19-20 are side views illustrating the protecting of an example SEL analyte interrogation stage 520 (shown completed in FIG. 6) with method 100 described above. FIG. 19 illustrates an uncoated or unprotected SEL analyte interrogation stage 520 comprising a fluidic container 504, substrate 24 and pillars 26. Container 504 forms a volume to contain and receive a fluid/liquid. In the example illustrated, container 304 has a floor formed by substrate 24 and sidewalls 328. Sidewalls rise from substrate 24. In one implementation, sidewalls 328 and substrate 24 form a fluid channel through which fluid may flow in which may be temporarily stopped to contain a fluid. In other implementations, sidewalls and roof 328 and substrate 24 form a basin to contain a fluid. Substrate 24 and pillars 26 are described above.

Figure 21:
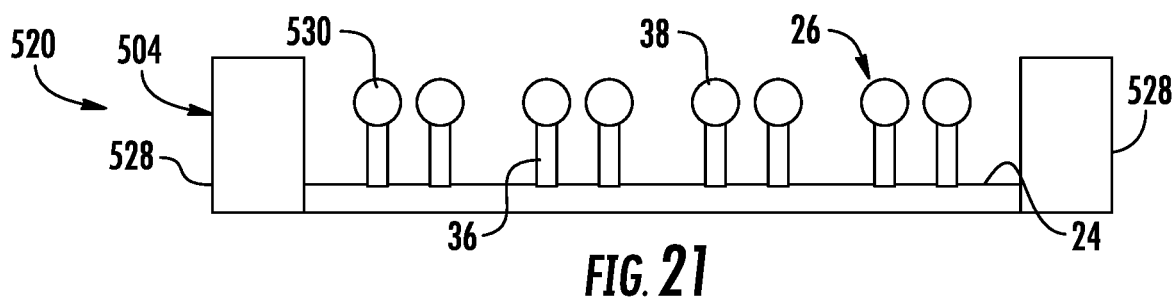

FIG. 20 illustrates one example of method 100, wherein metallic caps 38 pillars 26 are exposed to a sacrificial material. In the example illustrated, sacrificial material comprises a gas 529 or is in a gas phase. FIG. 21 illustrates the sacrificial material becoming deposited on the metallic caps 38 to form a sacrificial coating 530 on metallic caps 38. FIG. 21 illustrates the hardened protective sacrificial coating 530. Sacrificial coating 530 is similar to sacrificial coating 30 described above. In the example illustrated, sacrificial coating 530 comprises a film coating having a profile or shape corresponding to the profiler shape of pillars 26. In one implementation, the second official coating 530 has a thickness of 5 nm to 10 nm. In one implementation, the sacrificial coating 530 comprises inorganic oxides such as aluminum oxide, zinc oxide, titanium oxide art tantalum oxide. In other implementations, the sacrificial coating may comprise other materials that may be applied while in a gas state or phase.

FIGS. 22-26 are side views illustrating one example of method 200 for preparing and using a protected SEL analyte interrogation stage 520. FIGS. 22-26 illustrate method 200 being carried out using a protected or coated analyte interrogation stage 520, wherein sacrificial coating 530 specifically comprises a sacrificial material that is dissolvable in a liquid or solvent. For example, in one implementation, analyte interrogation stage 520 may comprise a sacrificial coating 530 formed from an inorganic oxide which is dissolvable with a weak acid.

Figure 22:
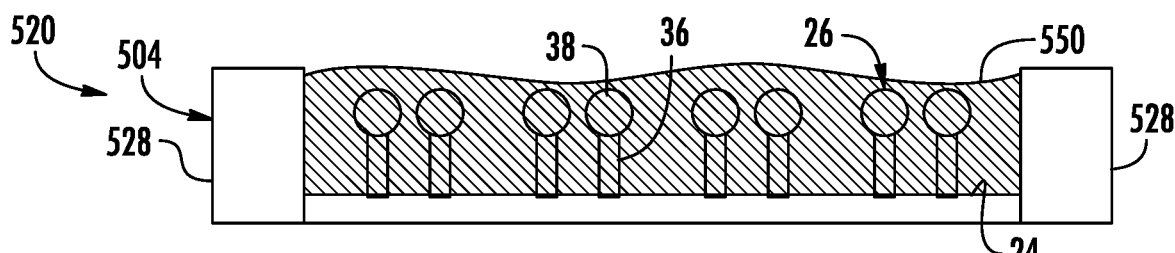
FIGS. 22-26 are side view schematically illustrating an example implementation of the method of FIG. 3.
Figure 23:
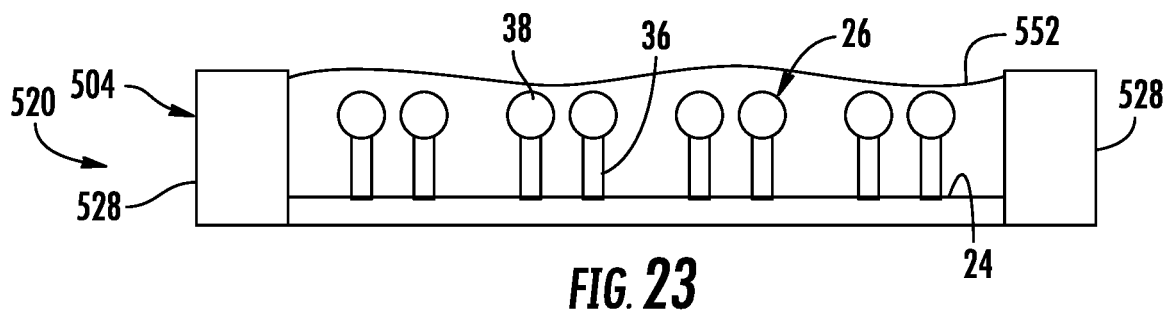

FIGS. 22 and 23 illustrate one example of block 210 of method 200. FIG. 22 illustrates one example of removing sacrificial coating 530. FIG. 22 illustrates the application of a solvent 550 or other liquid upon coating 530, wherein the composition of coating 530 and the composition of the liquid or solvent 550 are such that coating 530 dissolves in solvent 550. FIG. 23 illustrates stage 520 after sacrificial coating 530, dissolved within solvent 550, has been removed and further illustrates the application of a rinsing solution 552 to enhance the removal of solvent 550 and the dissolved sacrificial material of coating 530. Following such washing, analyte interrogation stage 520 is ready for use, providing an array of pillars 26 having contaminant free or cleaner metallic caps 38 ready for the adherence or binding of an analyte.

Figure 24:
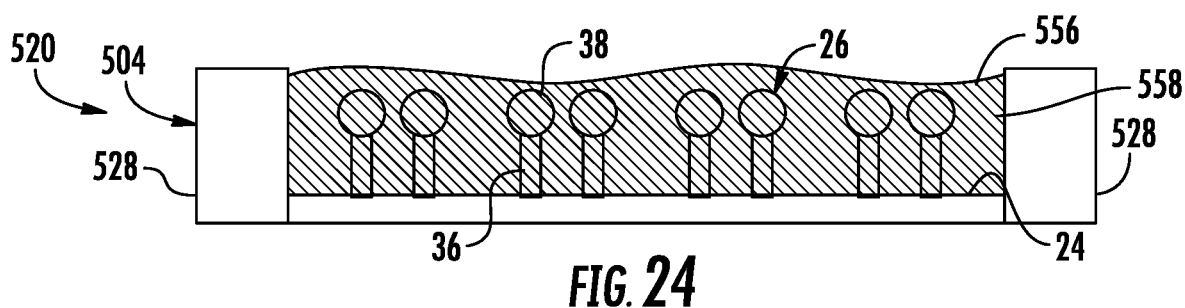
Figure 25:
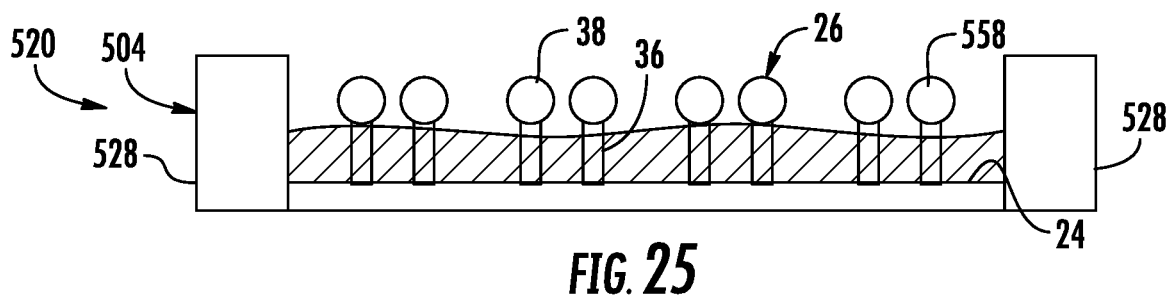
Figure 26:
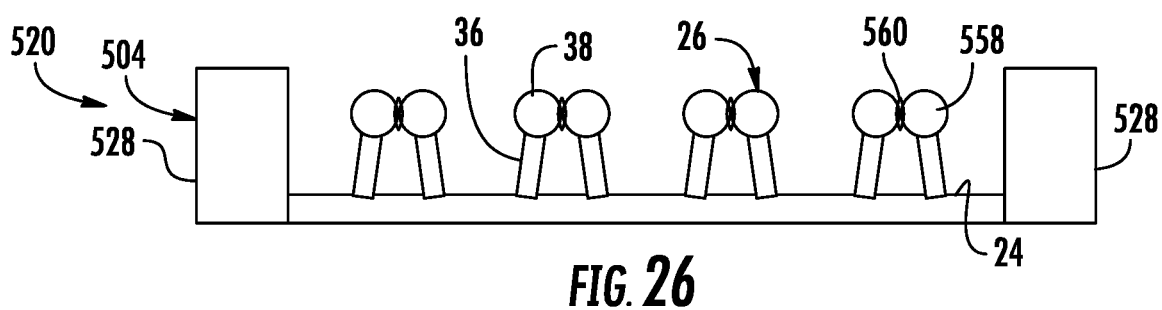

FIGS. 24-26 illustrate one example of blocks 214 and 218 of method 200. FIGS. 24 and 25 illustrate the binding of an analyte onto the metallic caps 38. FIG. 24 illustrates the immersion of pillars 26 and metallic caps 38 in analyte solution 556. Solution 556 contains analyte 558 which binds to or becomes deposited upon metallic caps 38. FIG. 25 illustrates the removal of analyte solution 556 followed by the rinsing of pillars 26 after analyte adsorption. FIG. 26 illustrates the closing of metallic caps 38. In particular, FIG. 26 illustrates the drying of pillars 26, such as through evaporation, such that capillary action closes pillars 26, creating hotspots 360 between consecutive closed pillars 26.

Following the closure of metallic caps 38 and the creation of hotspots 360, the analyte 358 on metallic caps 38 may be interrogated using surface enhanced luminescence procedures, such as surface enhanced Raman spectroscopy or fluorescence. As indicated above, sacrificial coating 530 provides a cleaner surface for metallic caps 38, providing better analyte adsorption and enhanced plasmon resonance.

Figure 27:
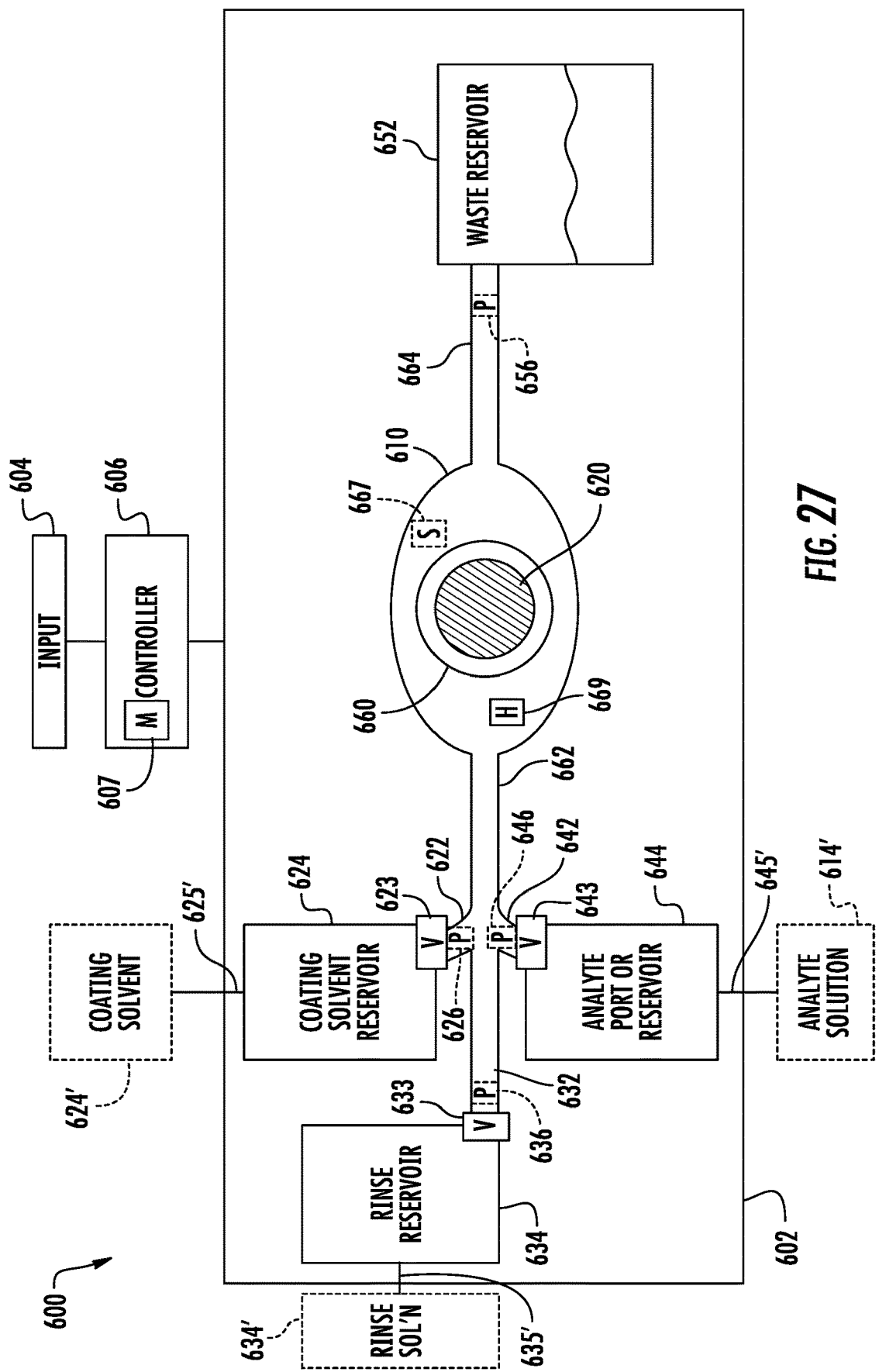
FIG. 27 is a schematic diagram of an example analyte interrogation system.

FIG. 27 is a schematic diagram of portions of an example analyte interrogation system 600. System 600 facilitates more automated interrogation of an analyte using a protected SEL analyte interrogation stage. System 600 facilitates automatic removal of a sacrificial coating, automatic binding of an analyte to the metallic caps of the interrogation stage an automatic closing of the metallic caps. System 600 comprises analyte interrogation package 602, input 604 and controller 606.

Interrogation package 602 comprises a housing forming a module that facilitates the automated sacrificial coating removal, analyte binding and pillar closing. Interrogation package 602 comprises interrogation or sensing chamber 610, SEL analyte interrogation stage 620, coating solvent supply passage 622, coating solvent reservoir 624, rinse supply passage 632, rinse reservoir 634, analyte solution supply passage 642, analyte solution reservoir 644 and waste reservoir 652.

Sensing chamber 610 comprises an internal volume containing SEL analyte interrogation stage 620. Sensing chamber 610 comprises a window 660, an inlet 662 and an outlet 664. Window 660 comprises an opening through which sensing light may be directed onto stage 620, impinging the analyte on the metallic caps of stage 620, and through which light from stage 620 (either reflected, scattered or output) may pass to a sensor. In one implementation, window 660 may comprise an open void. In another implementation, window 660 may comprise an opening covered by a transparent pane or panel.

Inlet 662 comprises a microfluidic passage connected to sensing chamber 610 and connected to each of passages 622, 632 and 642. Outlet 664 comprises a microfluidic passage extending from sensing chamber 610 to waste reservoir 652. Microfluidic passages may be formed by performing etching, microfabrication (e.g., photolithography), micromachining processes, 3D printing, lamination or any combination thereof in a substrate or secondary coating of the fluidic die. Some example substrates may include silicon based substrates, glass based substrates, gallium arsenide based substrates, and/or other such suitable types of substrates for microfabricated devices and structures. Accordingly, microfluidic channels, passages, chambers, orifices, and/or other such features may be defined by surfaces fabricated in the substrate of a fluidic die, in a photoresist or polymer coating on the fluidic die and/or in a sealing layer atop the fluidic die. Furthermore, as used herein, a microfluidic channel or passage may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.). Although illustrated as being in alignment with one another on opposite sides of chamber 610, inlet 662 and outlet 664 may have other layouts with respect to sensing chamber 610.

In some implementations, sensing chamber 610 may additionally support a sensor 667 (shown in broken lines). Sensor 667 may comprise an optical sensor that senses a status of stage 620. For example, sensor 667 may sense whether a sacrificial coating has been fully dissolved a rinsed away from metallic caps of stage 620. In some implementations, sensor 667 may additionally or alternatively sense a closure state of the metallic caps of stage 620. In yet other implementations, sensor 667 may be omitted.

SEL analyte interrogation stage 620 may comprise any of the SEL analyte interrogation stage is 20, 320, 420, 520 described above, wherein the sacrificial coating comprises a coating having a composition that is dissolvable within the coating solvent contained within coating solvent reservoir 624. In one implementation, stage 620 is fixed within sensing chamber 610. In another implementation, stage 620 is removable from sensing chamber 610 through an access opening or door in package 602. In such an implementation, package 602 may be reused by exchanging a used stage 620 for an unused stage 620.

Coating solvent inlet passage 622 connects inlet 662 to coating solvent reservoir 624. Coating solvent reservoir 624 comprises a reservoir containing a coating solvent for dissolving and removing a sacrificial coating on the metallic caps of stage 620. In one implementation in which stage 620 comprises metallic caps coated by a sacrificial coating formed from an inorganic oxide, such as aluminum oxide, zinc oxide, tantalum oxide or titanium oxide, reservoir 624 may contain a weak acid. In the example illustrated, coating solvent reservoir 624 is selectively connectable to passage 622 by a valve 623 which may be selectively opened and closed by controller 606.

In some implementations, as shown in broken lines, package 602 may additionally comprise a microfluidic pump 626 selectively actuatable by controller 606 to pump fluid from reservoir 624 into sensing chamber 610. For example, in one implementation, pump 626 may comprise an inertial pump. In one implementation, pump 626 may comprise a thermal resistive element that upon being heated, vaporize the adjacent fluid to create a bubble, displacing on vaporize fluid. In some implementations, in which system 602 comprises pump 626, valve 623 may be omitted. As shown in broken lines, in other implementations, system 600 may alternatively utilize an external or remote coating solvent supply reservoir 624' connectable to a port 625' provided in package 602.

Rinse inlet passage 632 connects inlet 662 to rinse supply reservoir 634. Rinse supply reservoir 634 comprises a reservoir containing a rinsing solution for further rinsing and cleaning the metallic caps of stage 620. In one implementation, reservoir 634 may contain a rinsing solution such as ethanol. In the example illustrated, rinse supply reservoir 634 is selectively connectable to passage 622 by a valve 633 which may be selectively opened and closed by controller 606.

In some implementations, as shown in broken lines, package 602 may additionally comprise a microfluidic pump 636 selectively actuatable by controller 606 to pump fluid from reservoir 634 into sensing chamber 610. For example, in one implementation, pump 636 may comprise an inertial pump. In one implementation, pump 636 may comprise a thermal resistive element that upon being heated, vaporize the adjacent fluid to create a bubble, displacing on vaporize fluid. In some implementations, in which system 602 comprises pump 636, valve 633 may be omitted. As shown in broken lines, in other implementations, system 600 may alternatively utilize an external or remote rinse supply reservoir 634' connectable to a port 635' provided in package 602. In some implementations where rinsing is not performed, passage 632, valve 633 and reservoir 634 may be omitted.

Analyte solution inlet passage 632 connects inlet 662 to analyte solution supply reservoir 644. Analyte solution supply reservoir 644 comprises a reservoir containing a solution caring and analyte to be interrogated. In one implementation, reservoir 644 may comprise an inlet by which an analyte solution may be injected or deposited in reservoir 644. In the example illustrated, analyte solution supply reservoir 644 is selectively connectable to passage 622 by a valve 643 which may be selectively opened and closed by controller 606.

In some implementations, as shown in broken lines, package 602 may additionally comprise a microfluidic pump 646 selectively actuatable by controller 606 to pump fluid from reservoir 644 into sensing chamber 610. For example, in one implementation, pump 646 may comprise an inertial pump. In one implementation, pump 646 may comprise a thermal resistive element that upon being heated, vaporize the adjacent fluid to create a bubble, displacing on vaporize fluid. In some implementations, in which system 602 comprises pump 646, valve 643 may be omitted. As shown in broken lines, in other implementations, system 600 may alternatively utilize an external or remote analyte solution supply reservoir 644' connectable to a port 645' provided in package 602.

Waste reservoir 652 comprises a volume in which fluid is discharged from sensing chamber 610 and transmitted through outlet 664 may be stored until disposal of package 602. In some implementations, as shown in broken lines, package 602 may additionally comprise a microfluidic pump 656 selectively actuatable by controller 606 to pump fluid from sensing chamber 610 into waste reservoir 652 or through a waste discharge port of package 602. For example, in one implementation, pump 626 may comprise an inertial pump. In one implementation, pump 656 may comprise a thermal resistive element that upon being heated, vaporize the adjacent fluid to create a bubble, displacing on vaporize fluid. In other implementations, waste reservoir 652 may alternatively comprise a discharge port through which fluid discharged from sensing chamber 610 through outlet 664 may be discharged.

Input 604 comprises a device by which selections are commands may be provided to controller 606. Input 604 may comprise a keyboard, touchpad, touchscreen, mouse and displayed graphical user interfaces, a microphone with associated speech recognition or the like.

Controller 606 comprises a device that controls the operation of valves 623, 633 and 643 to prepare and use stage 620. In one implementation, controller 606 carries out method 200 described above. Controller 606 may comprise a processing unit that follows instructions contained in a non-transitory computer-readable medium for carrying out method 200. In one implementation, controller 606, upon receiving a start command through input 604, actuates valve 623 and/or actuates pump 626 to direct the coating solvent within reservoir 624 or through port 625' into sensing chamber 610. Following a predetermined amount of time or upon sensing substantial or complete dissolving of sacrificial coating of stage 620 by sensor 667, controller 606 may discharge the solvent from sensing chamber 610 by actuating pump 656.

Once the solvent and the dissolved sacrificial material or sacrificial coating previously upon the metallic caps of stage 620 has been withdrawn, controller 606 may output control signals actuating valve 633 and/or pump 636 to direct the rinse solution in reservoir 634 into sensing chamber 610. In one implementation, the rinse solution is passed through and across stage 620 directly into waste reservoir 652. In another implementation, stage 620 is permitted to soak in the rinse solution prior to the discharge of the rinse solution into waste reservoir 652 by pump 656 in response to signals from controller 606.

Following the withdrawal of the rinsing solution from sensing chamber 610, such as being sensed by sensor 667, controller 606 may output control signals actuating valve 643 and/or pump 646 to direct analyte solution contained within reservoir 644 into sensing chamber 610. Following a sufficient incubation time to allow the analyte to bind to the metallic caps of stage 620, controller 606 may output control signals actuating pump 656 to withdraw the analyte solution into waste reservoir 652 or three with discharge port. Thereafter, evaporation of any remaining analyte solution may result in capillary forces that close the metallic caps of stage 620, readying the analyte bound on stage 6204 interrogation through window 660. In some implementations, package 602 may additionally comprise a heater 667 within or adjacent to sensing chamber 610, such as a resistive heater, which may be selectively actuated by controller 606 to accelerate the drying and evaporation of the remaining analyte solution within sensing chamber 6102 accelerate closing of the metallic caps of stage 620.

In some implementations, the instructions contained in the non-transitory computer-readable medium 607 of controller 606 may prompt a user to identify characteristics of stage 620, characteristics of the coating solvent being used, characteristics of the rinse solution being used and/or characteristics of the analyte solution or analyte, wherein controller 606 consults a lookup table or other memory which identifies predetermined times for sufficiently dissolving the sacrificial coating of stage 620, sufficient time for adequately rinsing stage 620, or sufficient time for incubating the analyte for binding of analyte to stage 620.

In one implementation, controller 606 and its associated input 604 a releasably connectable to package 602, wherein input 604 and controller 606 may be utilized with interchangeable packages 602. For example, in one implementation, package 602 may comprise at least one of contact pads, pins or other connection interfaces by which controller 606 may be releasably connected to package 602 and make electrical signal connection with each of valves 623, 633, 643, pumps 626, 636, 646, 656, sensor 667 or heater 669. In other implementations, input 604 and controller 606 may alternatively be provided as part of package 602.

Figure 28:
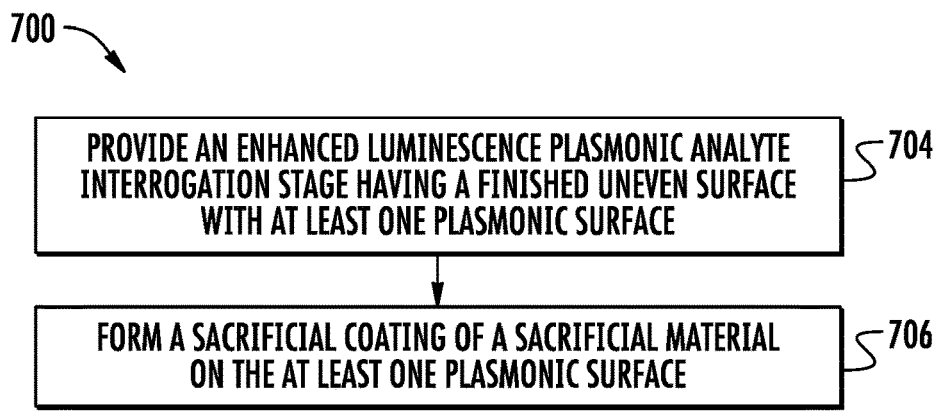
FIG. 28 is a flow diagram of an example method for forming an SEL analyte interrogation stage.
Figure 29:
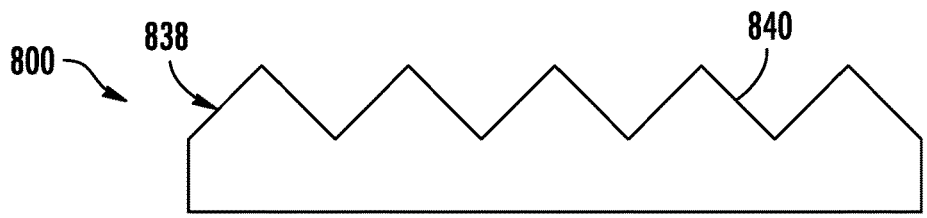
FIG. 29 is a side view of an example SEL analyte interrogation stage having a finished uneven plasmonic surface.
Figure 30:
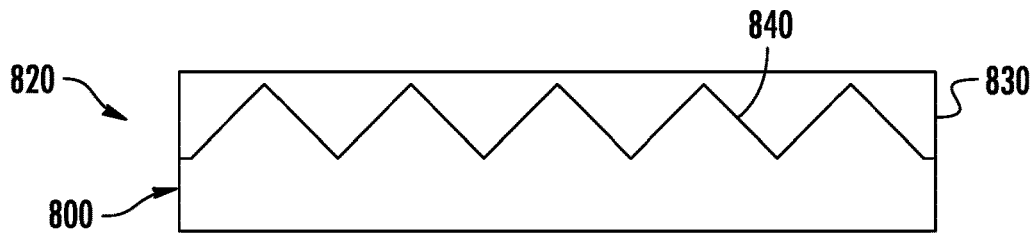
FIG. 30 is a side view of an example protected SEL analyte interrogation stage with the finished uneven plasmonic surface coated with a sacrificial coating.

FIG. 28 is a flow diagram of an example method 700 for forming an example protected SEL analyte interrogation stage. FIG. 30 illustrates one example protected SEL analyte interrogation stage 820 formed by method 700. As indicated by block 704 in FIG. 28, an enhanced luminescence plasmonic analyte interrogation stage having a finished uneven surface with at least one plasmonic surface is provided. One example of a finished uneven surface with at least one plasmon a surface is shown in FIG. 29, wherein a layer plasmonic material 838, formed from a plasmonic material such as gold or silver, has a roughened or uneven surface 840. Examples of other finished uneven plasmonic surfaces are described above, wherein the caps 38 each form a portion of an overall uneven plasmonic surface for an SEL analyte interrogation stage.

As indicated by block 706, a sacrificial coating of a sacrificial material is formed on the plasmonic surface or surfaces. As shown by FIG. 30, a sacrificial coating 830 is formed on the uneven plasmonic surface 840. In the example illustrated, coating 830 completely fills in the voids between the peaks of the uneven surface 840 and further rises above such peaks. While surface 840 of stage 800 is uneven, rough or jagged, the uppermost surface of the sacrificial coating 830 upon surface 840 is level, smooth or flat.

Coating 830 may be similar to coating 30 described above. In such an implementation, the protected stage 820 may be paired for use as described above with respect to coating 30 by removing coating 830 prior to use of stage 800. As described above, the particular materials for coating 930 may vary depending upon the method by which coating 930 is to be removed when preparing stage 920 for use.

Figure 31:
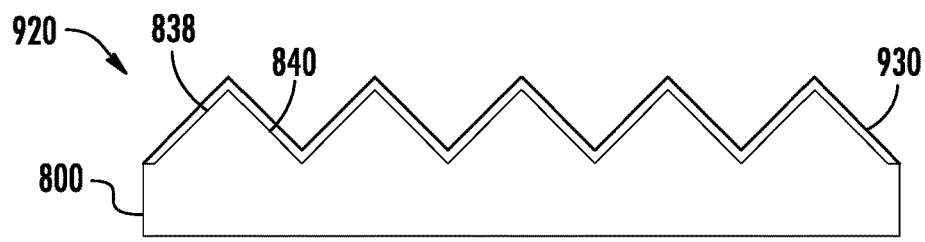
FIG. 31 is a side view of another example protected SEL analyte interrogation stage formed according to the method of FIG. 28.

FIG. 31 is a side view illustrating another example protected SEL analyte interrogation stage 920 that may be formed according to the method 700 of FIG. 28. Stage 920 is similar to stage 820 except that in block 706 of method 700, the sacrificial coating of the sacrificial material is formed as a film or conformal coating 930, wherein coating 930 has an outer profile or shape that parallels or corresponds to the outer profile or shape of the uneven surface 840. In the example illustrated where uneven surface 840 is jagged, having teeth, coating 930 is also jagged having an outer surface with the same corresponding teeth.

In one implementation, the sacrificial material may be applied or deposited on surface 840 using atomic layer deposition. Such atomic layer deposition facilitates the forming of sacrificial coating 930 as a film coating. In other implementations, the forming of the film or conformal coating 930 may be carried out using other techniques such as chemical vapor deposition, e-beam evaporation or thermal evaporation. The depositions may be metal which is subsequently oxidized.

Coating 930 may be similar to coating 30 described above. In such an implementation, the protected stage 920 may be prepared for use as described above with respect to coating 30 by removing coating 930 prior to use of stage 800. As described above, the particular materials for coating 930 may vary depending upon the method by which coating 930 is to be removed when preparing stage 920 for use.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced luminescence analyte interrogation stage comprising:
    a substrate;
    an array of pillars projecting from the substrate, each of the pillars comprising a post formed from a first material and a cap on the post, the cap having a plasmonic surface and formed from a second material different than the first material; and
    a sacrificial coating covering the cap of each of the pillars, wherein the sacrificial coating comprises a layer of material upon the substrate, the layer extending over the pillars and filling voids between the pillars.

2. The interrogation stage of claim 1, wherein the sacrificial coating comprises a material that is separable from the metallic cap while maintaining an integrity of the array of pillars.

3. The interrogation stage of claim 2, wherein the sacrificial coating comprises a material that is separable from the metallic cap upon the application of heat to the material.

4. The interrogation stage of claim 2, wherein the sacrificial coating comprises a material that is separable from the metallic cap upon application of a solvent to the material.

5. The interrogation stage of claim 2, wherein the sacrificial coating comprises a material that is separable from the metallic cap upon application of a selected wavelength of light.

6. A method comprising:
    providing an enhanced luminescence plasmonic analyte interrogation stage having a finished uneven surface with at least one plasmonic surface, comprising an array of pillars; and
    forming a sacrificial coating of a sacrificial material on the at least one plasmonic surface, wherein the sacrificial coating comprises a film of material having a profile corresponding to a profile of the array of pillars.

7. The method of claim 6 further comprising:
    removing the sacrificial coating; and
    binding an analyte to the at least one plasmonic surface.

8. The method of claim 7, wherein the removing of the sacrificial coating comprises dissolving the sacrificial coating with a solvent.

9. The method of claim 7, wherein the removing of the sacrificial coating comprises impinging the sacrificial coating with a selected wavelength of light.

10. The method of claim 7, wherein the removing of the sacrificial coating comprises heating the sacrificial coating or removing the sacrificial coating with a gas phase etchant.

11. A surface enhanced luminescence analyte interrogation stage comprising:
    an uneven plasmonic surface having a profile of an array of pillars; and
    a sacrificial coating formed by a film of sacrificial material having a profile corresponding to the profile of the uneven plasmonic surface, wherein the sacrificial coating comprises a film of material having a profile corresponding to a profile of the array of pillars.

12. The interrogation stage of claim 11, wherein each of the pillars provides a portion of the uneven plasmonic surface.

13. The interrogation stage of claim 11, wherein each of the pillars comprises a post formed from a first material and a cap on the post, the cap providing the portion of the uneven plasmonic surface and being formed from a second material different than the first material.

* * * * *